(12) United States Patent
Pacella et al.

(10) Patent No.: US 9,882,809 B2
(45) Date of Patent: Jan. 30, 2018

(54) JUST-IN TIME FORWARDING INFORMATION BASE

(75) Inventors: Dante J. Pacella, Charles Town, WV (US); Norman Richard Solis, Fairfax, VA (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1340 days.

(21) Appl. No.: 12/624,667

(22) Filed: Nov. 24, 2009

(65) Prior Publication Data

US 2011/0122889 A1    May 26, 2011

(51) Int. Cl.
*H04L 12/741* (2013.01)
*H04L 12/747* (2013.01)

(52) U.S. Cl.
CPC ............ *H04L 45/54* (2013.01); *H04L 45/742* (2013.01)

(58) Field of Classification Search
None
See application file for complete search history.

(56) References Cited

U.S. PATENT DOCUMENTS

| | | | |
|---|---|---|---|
| 6,707,817 B1* | 3/2004 | Kadambi et al. | 370/390 |
| 2006/0083254 A1* | 4/2006 | Ge et al. | 370/401 |
| 2007/0253377 A1* | 11/2007 | Janneteau et al. | 370/338 |
| 2009/0172192 A1* | 7/2009 | Christian et al. | 709/242 |
| 2009/0238179 A1* | 9/2009 | Samprathi | 370/389 |
| 2009/0274044 A1* | 11/2009 | Goose et al. | 370/225 |
| 2010/0061236 A1* | 3/2010 | Joshi | 370/231 |
| 2010/0080233 A1* | 4/2010 | Kwapniewski et al. | 370/395.31 |
| 2010/0124220 A1* | 5/2010 | Morris | 370/389 |
| 2011/0075680 A1* | 3/2011 | Sun et al. | 370/419 |

* cited by examiner

*Primary Examiner* — Faruk Hamza
*Assistant Examiner* — Thinh Tran

(57) ABSTRACT

A device may include a line card and a control module. The line card may include a memory that stores a local routing table. The line card may request a routing entry from a routing table, receive the routing entry, insert the routing entry in the local routing table, and age out stale routing entries from the local routing table. The control module may include the routing table. The control module may distribute the routing entry in the routing table to the line card.

20 Claims, 8 Drawing Sheets

JUST-IN TIME FORWARDING INFORMATION BASE

BACKGROUND INFORMATION

A typical router performs two functions: a routing function and forwarding function. The routing function includes exchanging routing messages (e.g., route advertisements) with other network devices to generate a forwarding information base (FIB). The forwarding function includes forwarding packets toward their destinations in accordance with routing entries in the FIB.

A typical FIB in today's line-rate Application-specific Integrated Circuit (ASIC)-based router requires expensive Static Random Access Memory (SRAM) to store the FIB. In such a router, the size of the FIB, and thus the cost of the router, depends directly on its number of routing entries.

The number of routing entries in a FIB can become large for several reasons. For example, a number of routing entries in a FIB may reflect a large number of routes that the FIB maps in a network (e.g., the Internet). According to some projections, Internet Protocol version 4 (IPv4) or IPv6, and virtual private network (VPN) routes in IP networks may be increasing at a rate that will cause FIBs in routers of all different platforms to grow and exhaust their available memory within five years.

In another example, the number of routing entries in a FIB can increase due to route deaggregation announcements. A route deaggregation announcement occurs when a longer Classless Inter-Domain Routing (CIDR) prefix is advertised with the same Border Gateway Protocol (BGP) Path attributes as a shorter net mask. For example, Autonomous System 1 (AS1) may advertise 10.0.0.0/20 as well as 10.0.0.0/24, 10.0.1.0/24, 10.0.2.0/24, 10.0.3.0/24, 10.0.4.0/24, 10.0.5.0/24, 10.0.6.0/24, 10.0.7.0/24, and/or 10.0.8.0/24, all with the same BGP attributes (e.g., Weight, ASpath, Multi-Exit Discriminator (MED), Local Preference, Origin, Next Hop, etc.). Without the deaggregation announcement, AS1 may simply advertise 10.0.0.0/20 with the same BGP attributes.

This type of router behavior may be prevalent for different reasons, and can greatly increase the sizes of Internet FIBs (e.g., by 25%). For example, some systems provide deaggregation announcements as a Best Current Practice (BCP) to prevent a longer CIDR prefix advertised by another autonomous system (e.g., AS2) from being preferred by routers, and thus, hijacking a path from, for example, AS1. In another example, multi-homed or multi-connected networks may sometimes advertise deaggregated routes for traffic engineering, either assigning distinct CIDR prefixes across different links or attaching different values to change the preference between different BGP sessions.

Although technical solutions have been developed to cope with the problem (e.g., compress FIB entries), in the future, these solutions may not be sufficient to allow vendors to provide routers at the cost points that their customers (e.g., service providers, corporations with large IP networks, etc.) expect. Furthermore, even with a significant technological breakthrough in manufacturing SRAM or other high-speed memory, the line cards in routers must still accommodate a greater number of memory components in smaller space. This greater density of components requires additional power, circuit board real estate, and a more efficient cooling system, none of which can continue to scale indefinitely with increasing FIB entries.

DETAILED DESCRIPTION OF PREFERRED EMBODIMENTS

The following detailed description refers to the accompanying drawings. The same reference numbers in different drawings may identify the same or similar elements.

As used herein, the term "router" may refer to a network level 2 or level 3 (e.g., an Internet Protocol (IP) level) router or switch. The term "FIB" or "Best Routing Information Base" (BRIB) may refer to a forwarding information base (FIB) that includes all forwarding information within a router.

The term "source," as used herein, may refer to a node (e.g., a network node, socket, etc.) from which packets emerge. The term "destination," as used herein, may refer to a node to which the packets are sent. A source or a destination may be a logical network source or destination that is associated with one or more identifiers (e.g., a domain name, an IP address, a port number, etc.). The term "flow," as used herein, may refer to a stream of packets from a source to a destination.

Figure 1:
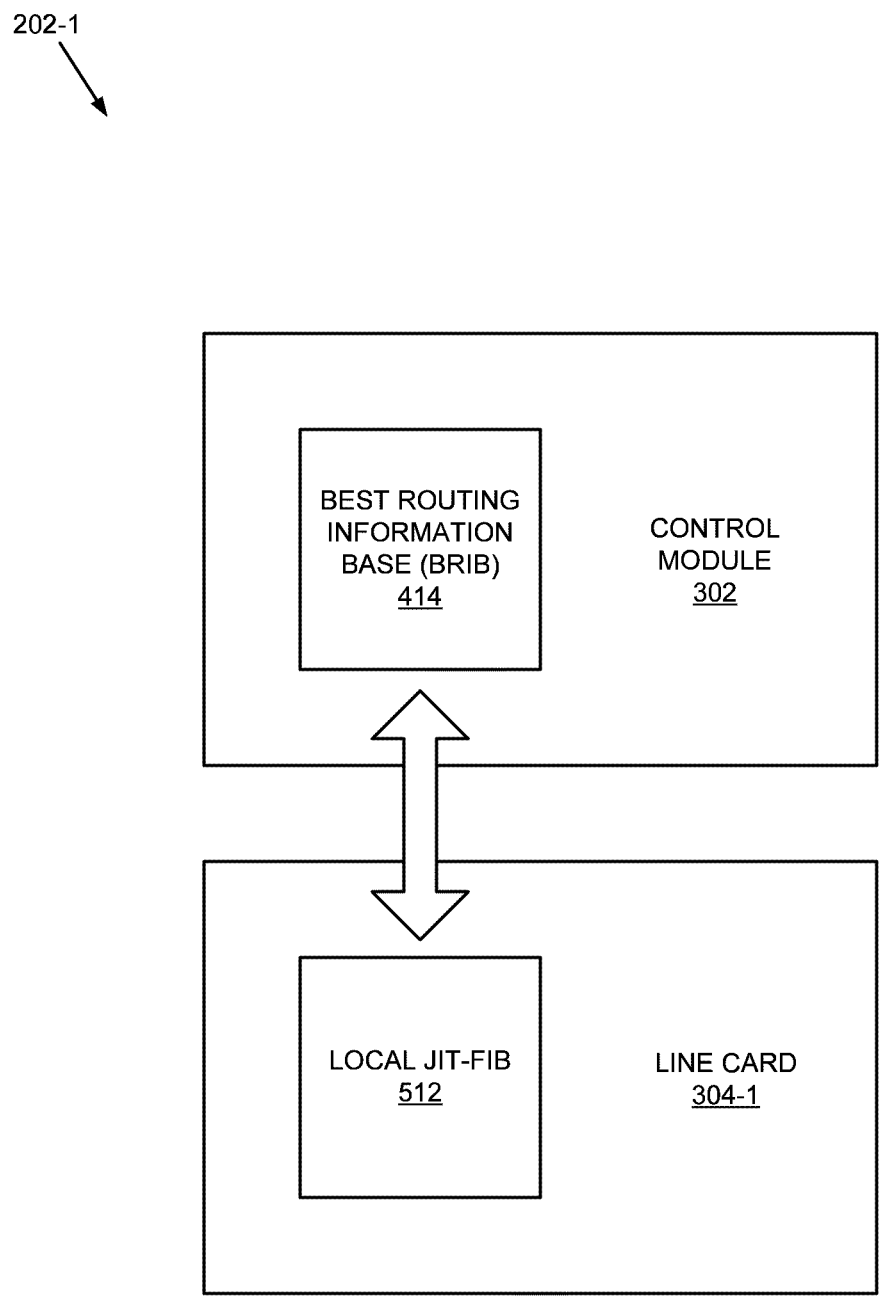
FIG. 1 illustrates concepts described herein.

FIG. 1 illustrates concepts described herein. As shown, a router 202-1 may include a line card 304-1 and control module 302. Line card 304-1 may receive packets from a network and forward the packets to their destinations based on routing information stored at a local just-in-time (JIT)-forwarding information base (FIB) 512. Control module 302 may collect and maintain the routing information in a BRIB 414. Local JIT-FIB 512 may include a portion of BRIB 414, and may act as a local cache of BRIB 414 at line card 304-1.

In FIG. 1, router 202-1 may conserve memory by using local JIT-FIB 512 in place of a local, copy of BRIB 414. Local JIT-FIB 512 may be smaller than BRIB 414, because local JIT-FIB 512 may be populated and/or repopulated as needed with a selected subset of BRIB entries. Furthermore, JIT-FIB entries that are not accessed for a particular epoch (e.g., 50 milliseconds (ms)) may be continually aged out of local JIT-FIB 512. By using local JIT-FIB 512, router 202-1 may require less memory.

Figure 2:
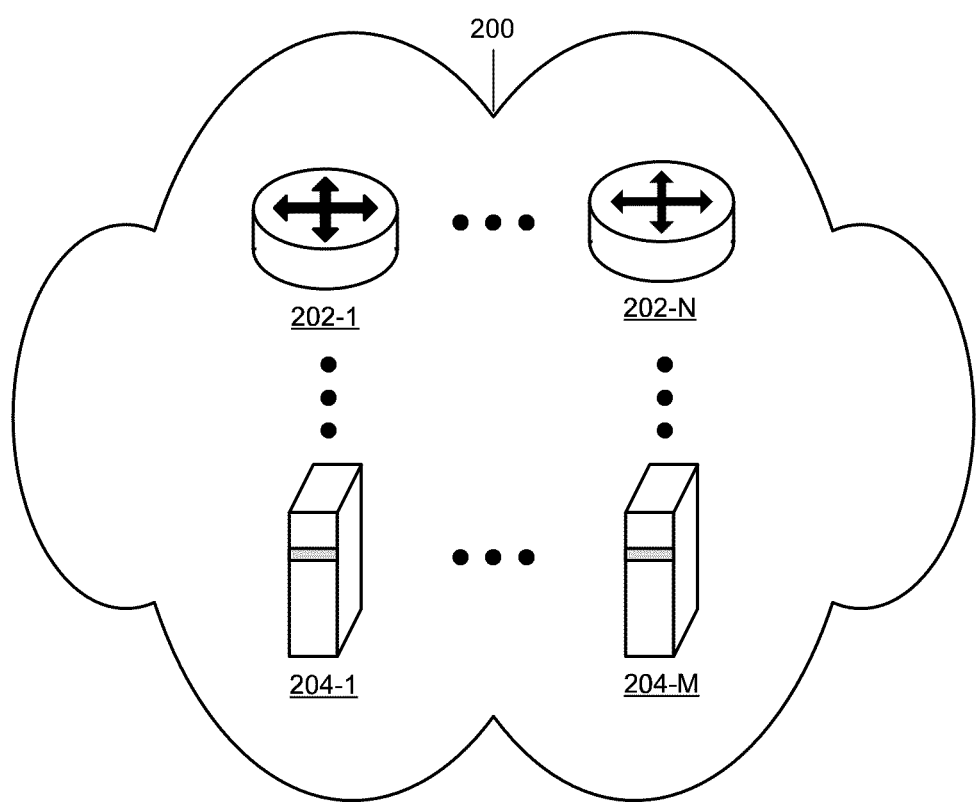
FIG. 2 shows an exemplary network in which the concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 2, network 200 may include routers 202-1 through 202-N (collectively "routers 202" and generically "router 202-*x*") and domain name system (DNS) servers 204-1 through 204-M (collectively "DNS servers 204" and generically "DNS server 204-*x*"). Although network 200 may include additional, fewer, or different components, they are not illustrated in FIG. 2 for the purpose of simplicity and ease of understanding. Router 202-*x* may perform routing and forwarding functions.

DNS server 204-*x* may include a network device that provides information (e.g., IP addresses) bound to domain names. In one implementation, DNS server 204-*x* may respond to a query from a client. The query may request DNS server 204-*x* to provide an IP address that is bound to a name in DNS server 204-*x*'s domain. The client may include a DNS resolver acting on behalf of a program/device (e.g., a browser). In response to the query, DNS server 204-*x* may either obtain the IP address from its cache/record, or initiate additional queries against other DNS servers 204 to resolve the name.

Figure 3:
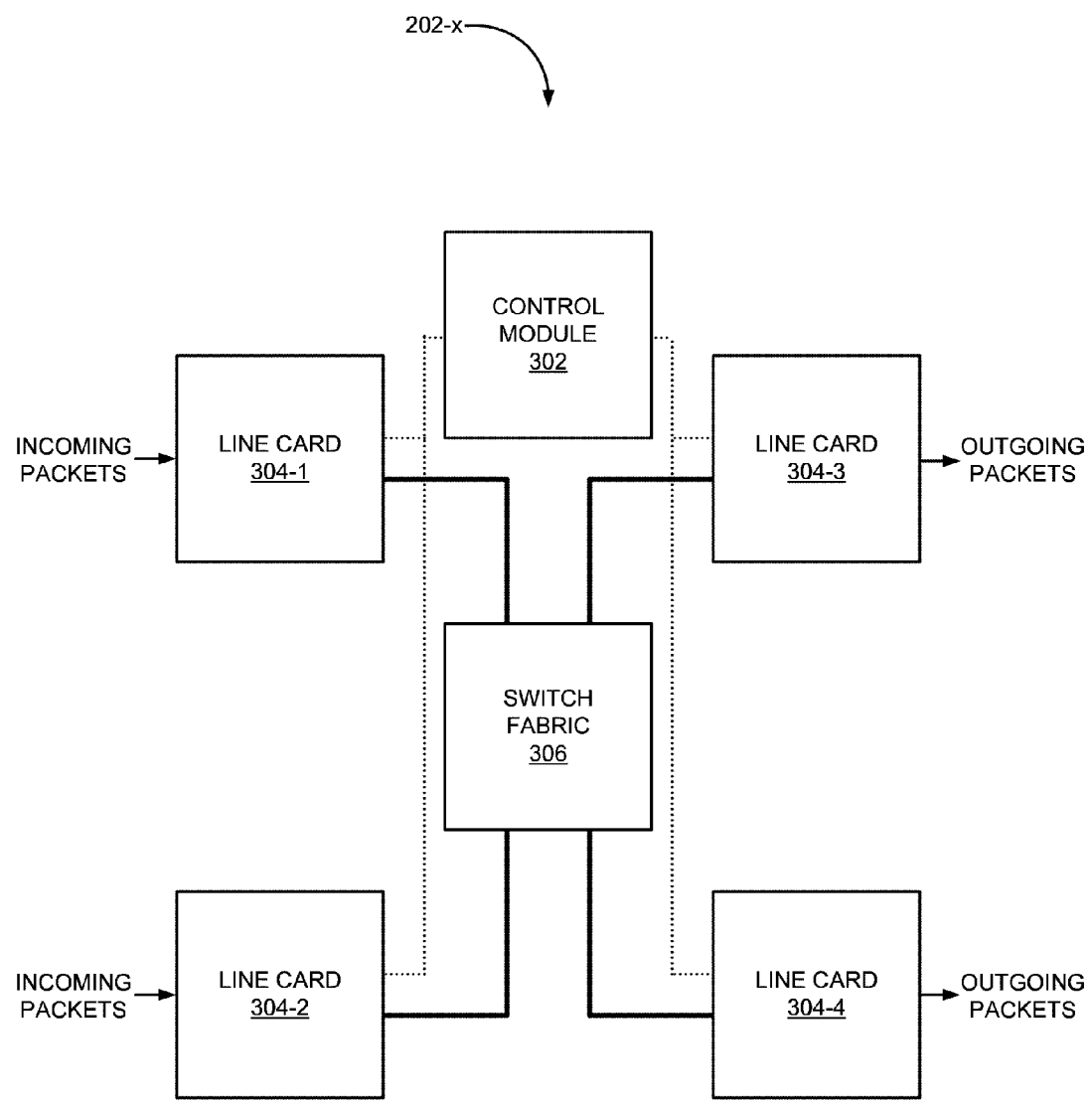
FIG. 3 shows exemplary components of a router of FIG. 2.

FIG. 3 illustrates a router 202-*x* according to an exemplary implementation. As shown in FIG. 3, router 202-*x* may include a control module 302, line cards 304-1 through 304-4 (collectively "line cards 304" and generically "line card 304-*x*") and a switch fabric 306.

Control module 302 may include components for managing routes, flow statistics, and/or other types of information that may require centralized processing. For example, control module 302 may gather or disseminate routing information from/to other routers 202 in accordance with routing/signaling protocols, organize the routing information in a routing table, etc. In another example, control module 302 may create BRIB 414 (FIG. 4B), and select and distribute entries in BRIB 414 to line cards 304. In yet another example, control module 302 may send messages requesting other routers to provide, to router 202-*x*, copies of DNS messages from DNS servers.

Line card 304-*x* may include components for receiving packets from devices or components in network 200, forwarding the packets to other devices in network 200, classifying packets, etc. In addition, line card 304-*x* may aid control module 302 in maintaining and/or updating local JIT-FIB 512 (FIG. 5B) that provides forwarding information to line card 304-*x*.

Switch fabric 306 may include switches for conveying packets from line cards 304 or other modules (not shown) to other line cards 304 or other modules.

Router 202-*x* may include fewer, additional and/or different components than those shown in FIG. 3. For example, router 202-*x* may include additional or fewer line cards or additional control modules. In another example, router 202-*x* may include components for performing deep packet inspection (DPI).

Figure 4A:
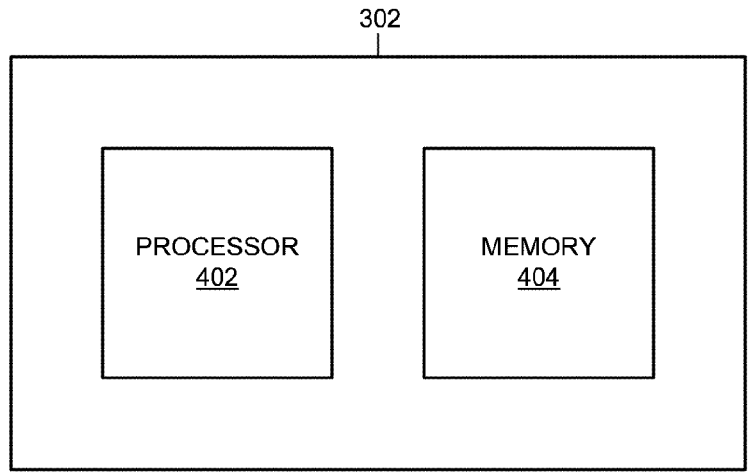
FIG. 4A is a block diagram illustrating exemplary components of the control module of FIG. 3.

FIG. 4A is a block diagram illustrating exemplary components of control module 302. As shown, control module 302 may include a processor 402 and a memory 404. Depending on the implementation, control module 302 may include additional, fewer, and/or different components than those illustrated in FIG. 4A.

Processor 402 may include one or more processors, microprocessors, ASICs, and/or Field Programmable Gate Arrays (FPGAs), and/or other processing logic. In some implementations, processor 402 may include processors dedicated to more specific functions, such as memory management, packet inspection, etc. Memory 404 may include static memory, such as read only memory (ROM), and/or dynamic memory, such as random access memory (e.g., dynamic RAM (DRAM), synchronous DRAM, static RAM (SRAM), etc.), or onboard cache, for storing data and machine-readable instructions. In addition, memory 404 may also include storage media, such as a magnetic and/or optical storage/recording medium. In some implementations, a portion of memory 404 may be mounted under a directory or mapped to a drive.

Figure 4B:
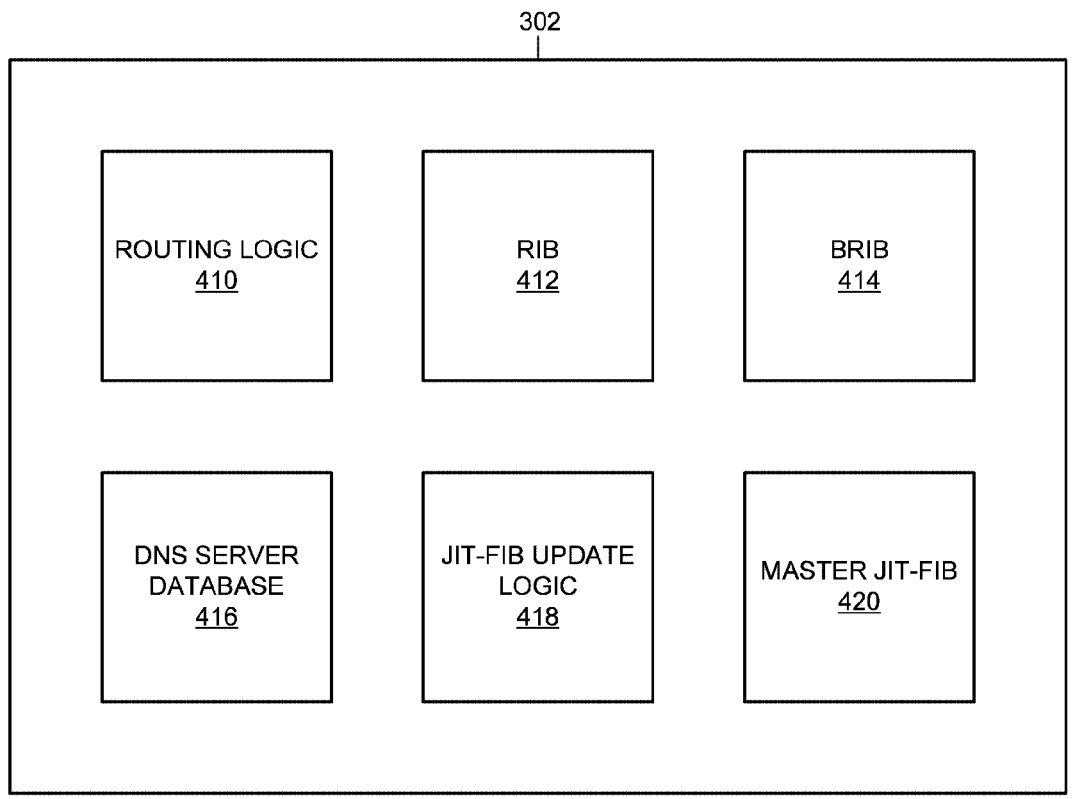
FIG. 4B is a block diagram illustrating exemplary functional components of the control module of FIG. 3.

FIG. 4B is a block diagram illustrating exemplary functional components of control module 302. As shown, control module 302 may include routing logic 410, a RIB 412, a BRIB 414, a DNS server database 416, JIT-FIB update logic 418, and a master JIT-FIB 420. Depending on the implementation, control module 302 may include additional, fewer, or different functional components. For example, control module 302 may include applications (e.g., a firewall application, a packet inspection application, etc.) or additional routing tables (e.g., a multicast routing information base (MRIB), a multicast tree information base (TIB), label information base (LIB), master label forwarding information base (LFIB), best label information base (BLIB), etc.). In another example, in some implementations, routing logic 410 and/or JIT-FIB update logic 418 may be integrated into a single component. In yet another example, control module 302 may not include master JIT-FIB 420.

Routing logic 410 may include hardware and/or software for communicating with other routers to gather and store routing information in a RIB or LIB, in accordance with one or more routing protocols. In addition, routing logic 410 may obtain, based on a RIB or LIB, for each destination address/label of packets to be forwarded by router 202-*x*, a line card identifier, next hop information, etc. The information may be stored in a BRIB 414 or LFIB.

RIB 412 may include descriptions of paths and metrics under different routing protocols. BRIB 414 may include routing entries, each of which may include, for a destination address/classless inter-domain routing (CIDR) prefix, a next-hop information and an identifier associated with egress line card 304-*y*. BRIB 414 may be optimized for fast lookups of line cards 304 via which packets may exit router 202-*x* and travel toward their destinations.

DNS server database 416 may include a list of DNS server addresses (e.g., authoritative DNS server addresses, root DNS server addresses, preferred DNS server addresses, etc.).

JIT-FIB update logic 418 may maintain local JIT-FIBs 512 in line cards 304. Initially, each of local JIT-FIBs 512 in line cards 304 may be seeded with routing entries (e.g., by line cards 304) that correspond to destination addresses of DNS servers listed in DNS server database 416. Thereafter, JIT-FIB update logic 418 may populate local JIT-FIBs 512 with routing entries in accordance with a strategy that recognizes a specific type of flow in network 200, a DNS flow. A "DNS flow" may include a DNS query sent from a source node (e.g., from a DNS resolver on the source node) to DNS server 204-*x* or a DNS reply from DNS server 204-*x* to the source node.

In implementing the strategy, JIT-FIB update logic 418 may send messages to other routers 202 and/or DNS servers 204, requesting copies of DNS replies from DNS servers 204 to be forwarded to router 202-*x*. Subsequently, when line card 304-*x* (in router 202-*x*) detects a receipt of a DNS reply, JIT-FIB update logic 418 may obtain, from BRIB 414, a routing entry corresponding to the IP address resolved by the DNS reply, and populate each of local JIT-FIBs 512 (FIG. 5B) in line cards 304 with the obtained routing entry.

The obtained routing entry may be referred to herein as a "DNS flow entry." Because the DNS flow entry is pre-fetched from BRIB 414 and installed in local JIT-FIB 512 in anticipation of receiving packets associated with the flow initiated via the DNS query/reply, line card 304-x may be ready to forward packets associated with the flow initiated via DNS query/reply before the packets are received at line card 304-x.

When line card 304-x receives a packet that does not belongs to a DNS flow, line card 304-x may attempt to forward the packet in accordance with a routing entry in local JIT-FIB 512. If local JIT-FIB 512 does not include the entry, however, line card 304-x may request JIT-FIB update logic 418 in control module 302 to obtain a corresponding routing entry in BRIB 414. Thereafter, JIT-FIB update logic 418 may populate each of local JIT-FIBs 512 with the corresponding routing entry obtained from BRIB 414.

In some implementations, in addition to populating local JIT-FIBs 512 with routing entries in BRIB 414, JIT-FIB update logic 418 may coordinate line cards 304 in removing, or "aging out," infrequently accessed routing entries in local JIT-FIB 512. In implementing the age out mechanism, each non-DNS flow entry in line card 304-x may be associated with an age out counter that is initially set to a maximum value when the entry is inserted in local JIT-FIB 512.

At predetermined time intervals, line card 304-x may decrement each age out counter. If line card 304-x looks up a particular routing entry in order to forward a packet, however, line card 304-x may reset the age out counter associated with the routing entry to the maximum value. As time passes, some of the age out counters in routing entries in local JIT-FIB 512 of line card 304-x may continue to decrease and reach a minimum value (e.g., zero), indicating that the corresponding routing entries are stale.

Periodically, JIT-FIB update logic 418 may obtain/receive, from each line card 304-x a list of stale routing entries. Upon identifying stale routing entries that are common to local JIT-FIBS 512 in line cards 304, JIT-FIB update logic 418 may cause line cards 304 to remove, overwrite, or mark the commonly stale routing entries as being eligible to be overwritten. In this way, local JIT-FIBs 512 in line cards 304 may be identical or substantially similar to one another.

In other implementations where local JIT-FIBs 512 of line cards 304 are allowed to vary from one another, JIT-FIB update logic 418 may not coordinate line cards 304 in aging out stale routing entries. Each line card 304-x may age out its own local JIT-FIB entries independently from other local JIT-FIBs 512.

Master JIT-FIB 420 may include a copy of local JIT-FIB 512 of line card 304-x. In some implementations, JIT-FIB update logic 418 may use master JIT-FIB 420 to facilitate bringing local JIT-FIBs 512 up-to-date. Toward such an end, each entry in master JIT-FIB 420 may include additional fields for storing information about local JIT-FIBs 512. For example, in one implementation, a routing entry in master JIT-FIB 420 may include fields for tracking which line cards 304 have marked the routing entry as being stale.

Figure 5A:
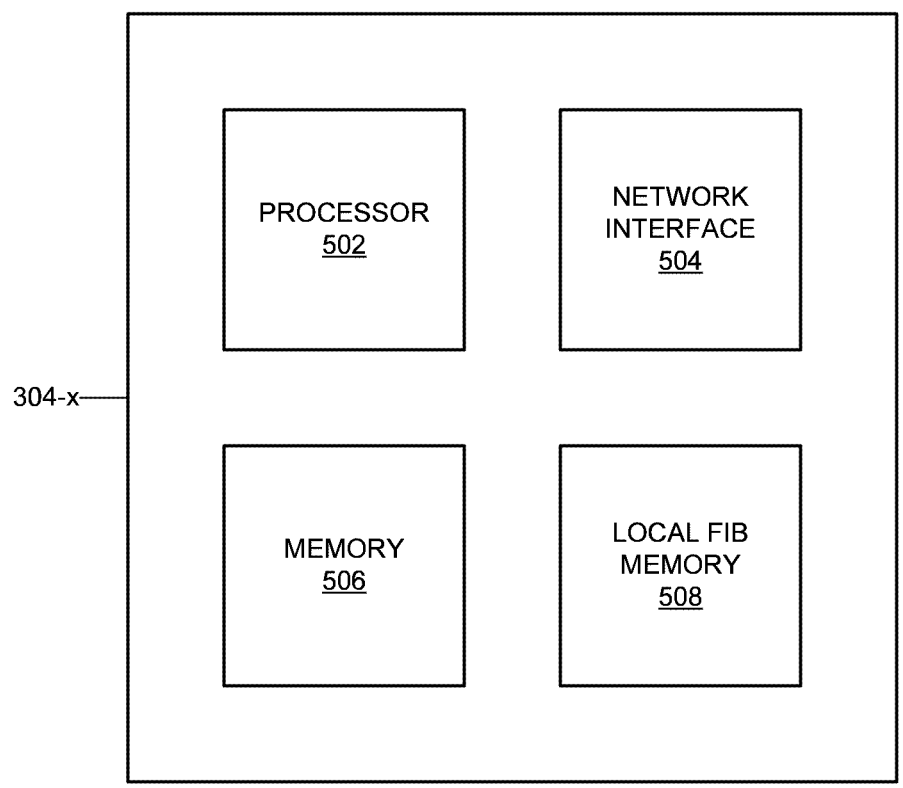
FIG. 5A is a block diagram illustrating exemplary components of a line card of FIG. 3.

FIG. 5A is a block diagram illustrating exemplary components of line card 304-x. As shown, line card 304-x may include a processor 502, network interface 504, memory 506, and local FIB memory 508. Depending on the implementation, line card 204-x may include additional, fewer, or different components than those illustrated in FIG. 5A.

Processor 502 may include one or more processors, microprocessors, Application Specific Integrated Circuits (ASICs), and/or Field Programmable Gate Arrays (FPGAs), and/or other processing logic. In some implementations, processor 502 may include processors that are dedicated to more specific functions, such as memory management, packet forwarding, etc.

Network interface 504 may include one or more physical ports or logical ports (e.g., Generic Routing Encapsulation (GRE) tunnel ports, LSP ports, IP Security (IPSec) ports, etc.) that enable line card 304-x to communicate with other devices, line cards, and/or systems. Via the physical ports, network interface 504 may communicate via a network, such as the Internet, a terrestrial wireless network (e.g., a WLAN), a satellite-based network, etc.

Memory 506 may include a static memory, such as read only memory (ROM), and/or dynamic memory, such as random access memory (e.g., DRAM, SDRAM, SRAM, etc.) or onboard cache, for storing data and machine-readable instructions. Memory 506 may provide, for example, space for queuing packets, packet headers, etc.

Figure 5B:
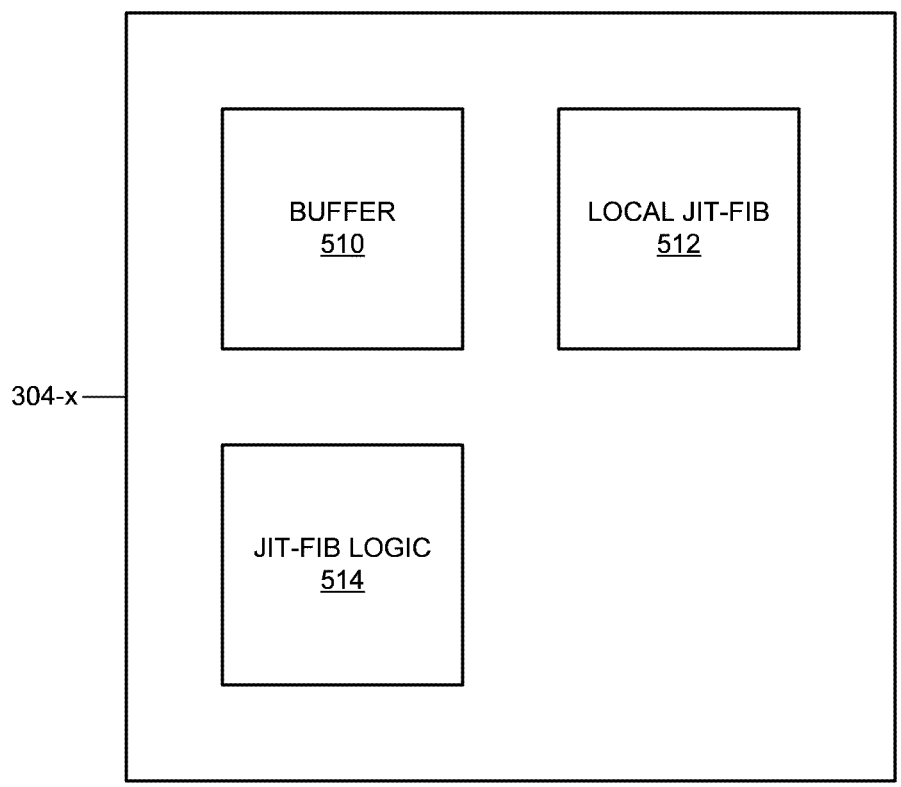
FIG. 5B is a block diagram illustrating exemplary functional components of the line card of FIG. 3.

Local FIB memory 508 may include a component for storing local JIT-FIB 512 (FIG. 5B). Local FIB memory 508 may be a portion of a larger memory component, or a stand-alone component. In one implementation, local FIB memory 508 may include a high-speed memory component, such as a SRAM or a ternary content addressable memory (TCAM). TCAM can retrieve, given a key, content associated with the key in a fixed span of time.

FIG. 5B is a block diagram illustrating exemplary functional components of line card 304-x. As shown, line card 304-x may include a buffer 510, local JIT-FIB 512, and JIT-FIB logic 514. Depending on the implementation, line card 304-x may include additional, fewer, or different components than those illustrated in FIG. 5B. For example, line card 304-x may include a component for storing/measuring flow statistics, etc.

Buffer 510 may queue incoming packets and information about the packets. If packets arrive in a burst, one or more of the packets may await in buffer 510 until higher priority packets are processed and/or transmitted.

Figure 5C:
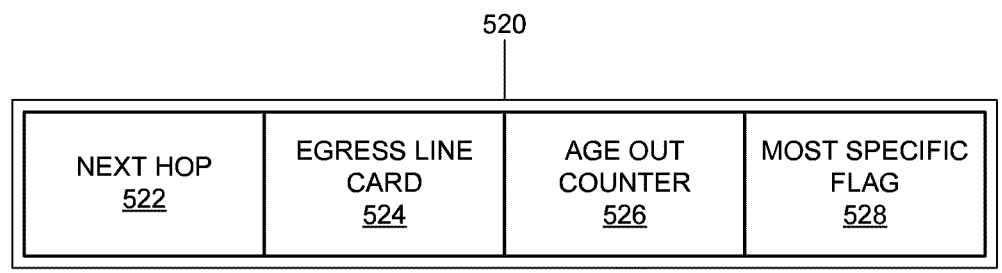
FIG. 5C illustrates exemplary components of a routing entry in the local JIT-FIB of FIG. 5B.

As described above, local JIT-FIB 512 may include routing entries used for forwarding packets. FIG. 5C illustrates exemplary fields of a routing entry 520 in local JIT-FIB 512. As shown, routing entry 520 may include a next hop field 522, egress line card field 524, age out counter field 526, and a most specific flag field 528. Depending on the implementation, local JIT-FIB 512 may include additional, fewer, or different fields than those illustrated in FIG. 5C.

Next hop field 522 may include the IP address of a device to which router 202-x is adjacent and to which a packet arriving at router 202-x may be sent, for the packet to be forwarded toward its destination address. Egress line card field 524 may include information that identifies egress line card 304-y through which the packet may be sent to the device identified by the next-hop address. Age out counter field 526 may include a value (herein "an age out counter") that indicates a time-to-live of routing entry 520 in local JIT-FIB 512, after routing entry 520 is inserted in local JIT FIB 512 or is accessed (e.g., looked up) by line card 304-x. When routing entry 520 is inserted in local JIT-FIB 512 or accessed by line card 304-x, the age out counter in age out counter field 526 may be set to a predetermined, maximum value. As time passes, line card 304-x may decrement the age out counter until the age out counter reaches a minimum value, indicating that routing entry 520 is stale.

Most specific flag field 528 may indicate whether BRIB 414 may include a routing entry whose CIDR prefix matching a given destination address is longer (i.e., more specific) than the matching CIDR prefix of a routing entry in JIT-FIB 420 (FIG. 4B) or JIT-FIB 512 (FIG. 5B). For example, assume that a given address of a packet is 10.0.0.2; the CIDR prefix for routing entry 520 is 10.0.0.0/16; and most specific flag field 528 of routing entry 520 includes the value of "NO" or "OFF" (i.e., not set or 0). In such a case, BRIB 414 may include one or more routing entries that are more specific than the one corresponding to 10.0.0.0/16 (e.g., 10.0.0.0/24 and 10.0.10.0/24, which are more specific than 10.0.0.0/16 for destination 10.0.0.2). These more specific routing entries may or may not match or be applicable to a given destination (e.g., 10.0.10.0/24 is a more specific than 10.0.0.0/16, but does not match or is not applicable to destination 10.0.0.2).

As described above, when line card 304-x receives a packet, line card 304-4 may look up a routing entry in local JIT-FIB 512 based on the destination address of the packet. However, merely locating routing entry 520 in local JIT-FIB 512 does not ensure that routing entry 520 provides the most specific forwarding information. Because local JIT-FIB 512 caches DNS flow entries and the recently accessed entries in BRIB 414, it is possible that BRIB 414 includes a routing entry whose CIDR prefix provides a longer, better match. Most specific flag field 528 indicates whether there is such a possibility, or whether a lookup in local JIT-FIB 512 is "good enough." Without most specific flag 528, line card 304-x may frequently consult BRIB 414, whose access may be much slower than that of local JIT-FIB 512.

Continuing with the preceding example, assume that, in BRIB 414, a CIDR prefix which matches the destination address 10.0.0.2 is 10.0.0.0/24. In addition, assume that, in local JIT-FIB 512, a CIDR prefix that matches the destination address 10.0.0.2 is 10.0.0.0/16. In this instance, 10.0.0.0/24 in BRIB 414 provides a longer, more specific match to 10.0.0.2 than 10.0.0.0/16 in local JIT-FIB 512. Consequently, JIT-FIB update logic 418 may install, in master JIT-FIB 420 and local JIT-FIB 512, BRIB 414's routing entry that corresponds to 10.0.0.0/24, with the most specific route flag set to "ON" or "1." The newly installed entry in local JIT-FIB 512 may be used to forward the packet to its destination, 10.0.0.2.

If instead the CIDR prefix in BRIB 414 were 10.0.3.0/24 and BRIB 414 did not include entries with more specific CIDR prefix, then the CIDR prefix 10.0.0.0/16 in local JIT-FIB 512 would provide a longer match to 10.0.0.2 (i.e., 10.0.3.0/24 does not match 10.0.0.2). Consequently, in this case, the routing entry corresponding to 10.0.0.0/16 in local JIT-FIB 512 may be used to forward the packet to its destination, 10.0.0.2.

Returning to FIG. 5B, JIT-FIB logic 514 may forward packets that are received toward their destinations. In addition, JIT-FIB logic 514 may operate in conjunction with JIT-FIB update logic 418 in maintaining local JIT-FIB 512. For example, JIT-FIB logic 514 may identify an incoming packet as a DNS query or a DNS reply, and if so, notify JIT-FIB update logic 418 to update local JIT-FIB 512.

In another example, JIT-FIB logic 514 may modify the age out counter in age out counter field 526 in routing entries 520 in each local JIT-FIB 512. More specifically, for example, JIT-FIB logic 514 may increment the age out counter in routing entry 520 when JIT-FIB logic 514 looks up routing entry 520 to identify egress line card 304-y via which the packet is to be forwarded to the destination address in network 200. In another example, JIT-FIB logic 514 may periodically (e.g., every 50 ms) decrement, in local JIT-FIB 512, the age out counter of each routing entry 520 that does not corresponds to an IP address of DNS server 204-x.

Figure 6:
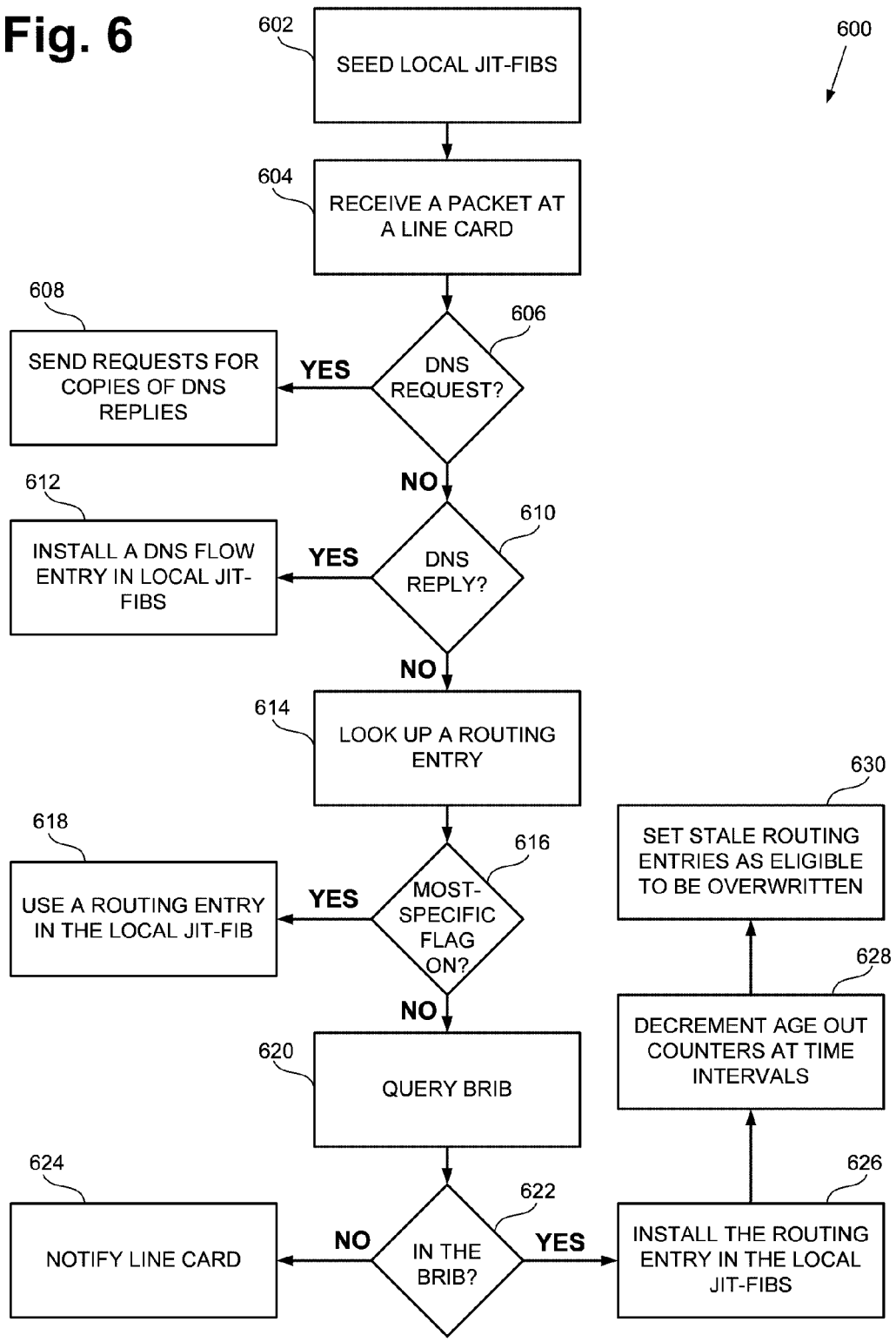
FIG. 6 is a flow diagram of an exemplary process that is associated with maintaining the just-in-time (JIT)-forwarding information base (FIB) of FIG. 4B.

FIG. 6 is a flow diagram of an exemplary process 600 associated with maintaining local JIT-FIB 512. As discussed above, components of control module 302 (e.g., JIT-FIB update logic 418) and/or line card 304-x (e.g., JIT-FIB logic 514) may update local JIT-FIB 512. Process 600 may begin with line card 304-x/JIT-FIB update logic 418 seeding local JIT-FIBs 512 with routing entries that correspond to destination addresses of DNS servers listed in DNS server database 416 (block 602). Unlike other entries in local JIT-FIBs 512, the seed entries may not be aged out.

Line card 304-x may receive a packet (block 604) and may determine whether the packet is a DNS request (block 606). If the packet is a DNS request (e.g., a request for IP address bound to a domain name) (block 606—YES), JIT-FIB update logic 418 may send messages through other routers 202 towards zero or more DNS servers 204 and, ultimately, one or more authoritative DNS servers (block 608). Herein, such messages may be referred to as "DNS Join messages."

When DNS Join messages are sent through routers 202, routers 202 that have forwarded the DNS request to DNS server 204-x may form a distribution tree. DNS replies from DNS server 204-x may then flow down the distribution tree back to the source of the DNS request. In effect, the DNS Join messages ensure that the DNS replies arrive at router 202-x via which the DNS request has reached DNS server 204-x. Without the DNS Join messages, router 202-x may or may not receive the DNS replies.

Figure 7:
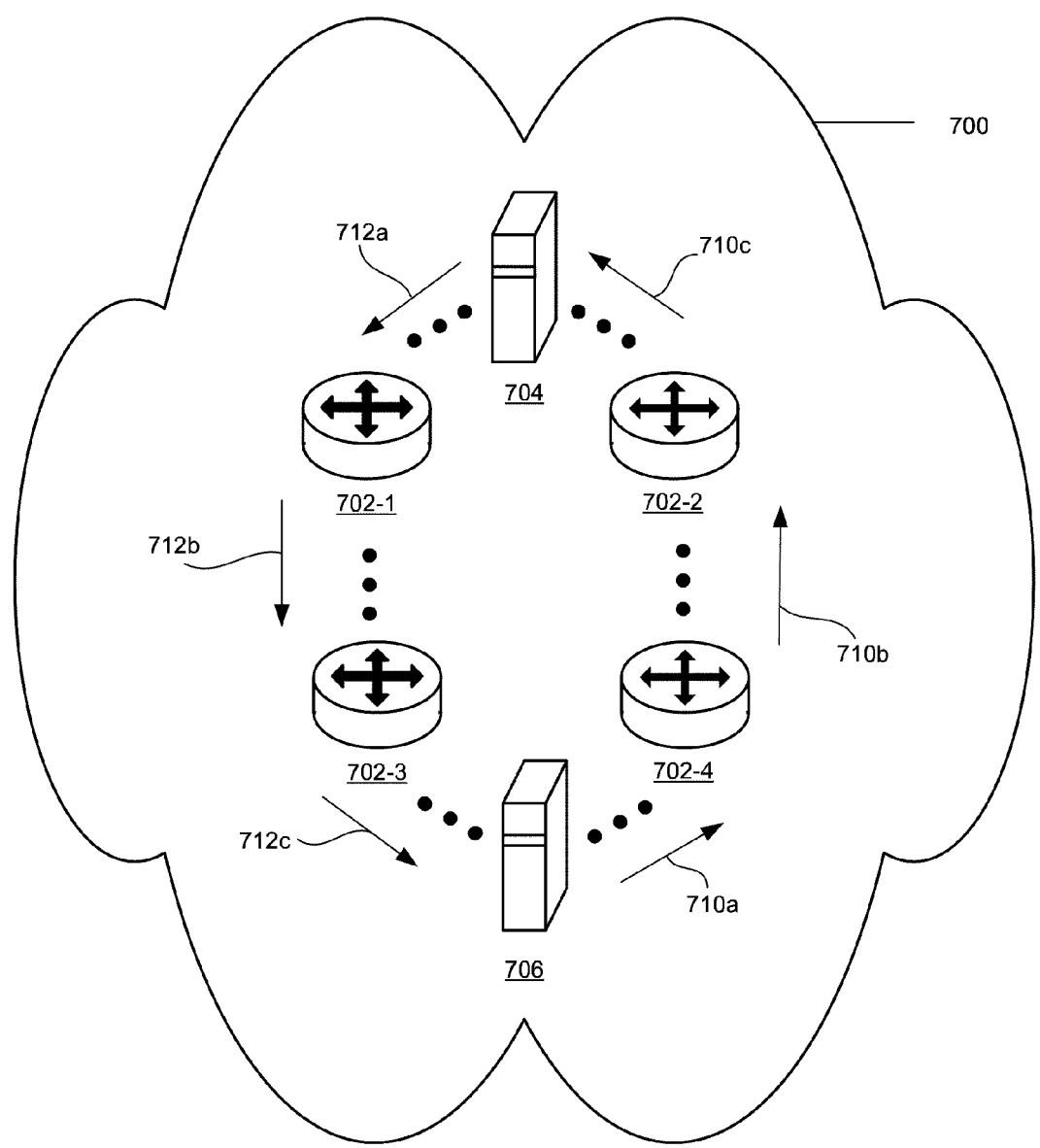
FIG. 7 is a diagram illustrating exemplary flow of messages that are associated with a DNS request.

FIG. 7 is a diagram illustrating exemplary flow of messages that are associated with a DNS request. As shown, network 700 may include routers 702-1 through 702-4, a device 704, and a DNS server 706. In the example, assume that router 702-1 has received a DNS request from device 704 via path 712a. In addition, assume that, upon receiving the DNS request, router 702-1 has dispatched DNS Join messages to routers 702-2 through 702-4 and forwarded the DNS reply to router 702-3 via path 712b.

Router 702-3 may then relay the DNS request to DNS server 706 via path 712c. When DNS server 706 responds with a DNS reply, the DNS reply may trace paths 710c, 710b, and 710a toward device 704. Consequently, router 702-1, which has dispatched the DNS Join message, may receive the DNS reply from router 702-4. Without the DNS join message, router 702-1 may not receive the DNS reply from router 702-4.

In one implementation, a DNS Join message may include the IP address of an authoritative DNS server from which DNS replies are transmitted, the IP address of a source network device that sent the DNS request (see block 606), and/or an identifier associated with the network of the source network device. If the authoritative DNS server address is not in a local cache (e.g., DNS server database 416), JIT-FIB update logic 418 may resolve the DNS server address by dispatching recursive DNS queries to DNS servers 204 (not shown).

After DNS Join messages have been sent and the DNS replies are received, line card 304-x in each of routers 202 in the distribution tree may use the DNS replies to pre-fetch and install DNS flow entries in local JIT-FIBs 512, as described in greater detail below. Each of the DNS flow entries may provide the best prefix corresponding to a route via which the resolving IP address in the DNS reply may be reached.

Returning to FIG. 6, at block 606, if the packet is not a DNS request (block 606—NO), line card 304-x may determine if the packet is a DNS reply (block 610). If the packet is a DNS reply (block 610—YES), line card 304-x may determine whether a corresponding DNS flow entry (e.g., a routing entry corresponding to an address resolved by the DNS reply) is already installed in its local JIT-FIB 512. If it is not installed, line card 304-*x* may notify control module 302/JIT-FIB logic 418. In response, control module 302/JIT-FIB logic 418 may look up the DNS flow entry in BRIB 414, and populate each of local JIT-FIBs 512 in line cards 304 with the DNS flow entry. In addition, line card 204-*x* may set the age out counter in age out counter field 526 of each of the DNS flow entries in local JIT-FIB 512 to a predetermined value (e.g., value that corresponds to 50 ms).

If the packet is neither a DNS request (block 606—NO) nor DNS reply (block 610—NO), then line card 304-*x* may commence forwarding the packet, by performing a lookup, in its local JIT-FIB 512, of a routing entry whose CIDR prefix provides a longest match to the destination address of the packet (block 614). Furthermore, if most specific flag field 528 of the routing entry is "ON" (block 616—YES), line card 304-*x* may use the routing entry in its local JIT-FIB 512 to forward the packet toward its destination in network 100. In forwarding the packet, line card 304-*x* may reset the age out counter of the routing entry to the predetermined value. In some implementations, instead of resetting the age out counter, line card 304-*x* may increment or increase the age out counter.

If most specific flag field 528 is "OFF" (block 616—NO), line card 304-*x* may query BRIB 414 for a routing entry with a longer-address prefix (block 620) that matches the destination address of the packet. If BRIB 414 does not include such a routing entry (block 620—NO), JIT-FIB update logic 418/control module 302 may notify line card 304-*x* that no such matching entry exists in BRIB 414 (block 624). Line card 304-*x* may set the age out counter of the routing entry in local JIT-FIB 512 to the predetermined value, and forward the packet toward its destination in accordance with the routing entry.

If BRIB 414 includes a routing entry with a longer-address prefix match than that of the routing entry in line card 304-*x* (block 622—YES), control module 302/JIT-FIB update logic 418 may install the routing entry from BRIB 414 in local JIT-FIBs 512 (block 626), and set the age out counter of the installed routing entry to the predetermined value. In addition, line card 304-*x* may forward the packet in accordance with the installed routing entry.

At predetermined time intervals, line card 304-*x* may decrement age out counters in routing entries in local JIT-FIB 512 (i.e., non-seed entries) (block 628). When line card 304-*x* finds stale routing entries in its local JIT-FIB 512, line card 304-*x* may set such routing entries as being eligible to be overwritten with other routing entries (block 630). Alternatively, line card 304-*x* may remove such routing entries from local JIT-FIB 512.

In the above implementation, process 600 recognizes two different roles of an IP address: the role of the IP address as a network address and its role as an identifier. Consequently, process 600 treats DNS flows differently from other types of flows. However, process 600 may not involve a new protocol, such as Locator Identifier Separation Protocol (LISP) or Host Identity Protocol (HIP). Rather, process 600 extends existing protocols by grafting a multicast-like functionality onto DNS and linking the DNS to a signaling function.

In implementations described herein, router 202-*x* may install and maintain local JIT-FIB 512 at line card 304-1. Local JIT-FIB 512 may be smaller than the FIB/BRIB 414, because local JIT-FIB 512 may be populated and/or repopulated as needed with a selected subset of FIB/BRIB entries. Furthermore, JIT-FIB entries that are not accessed for a particular epoch (e.g., 50 ms) are continually aged out of local JIT-FIB 512. By using local JIT-FIB 512 rather than a copy of BRIB 414 or a full FIB, router 202-1 may require less memory.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in a different implementation, router 202-*x* may include a multi-protocol label switching (MPLS) switch/router. Accordingly, control module 302 may distribute or populate entries in Best LIB (BLIB) to line cards 304 in place of or in addition to BRIB 414. Additionally, line card 304-*x* may include a local JIT-label FIB (JIT-LFIB). Furthermore, each local JIT-LFIB may be maintained in a manner analogous to that in which local JIT-FIB 512 is maintained by different components in router 202-*x*.

In yet another example, in some implementations, router 202-*x* may employ an Intrusion Detection and Prevention (IDP) system to monitor or detect aberrations in packets, and remove useless entries in local JIT-FIBs 512. Such entries may have been installed in local JIT-FIB 512 due to spurious flows that are generated by malicious or misconfigured clients, or as seeds (e.g., routing entries that correspond to DNS server addresses) that are never looked up or used.

In still yet another example, in some implementations, router 202-*x* may not necessarily have issued a DNS Join message for router 202-*x* to install a DNS flow entry. For example, in FIG. 7, in one implementation, router 702-4 may install a DNS flow entry after router 702-4 receives a DNS reply without having issued a DNS Join message, or alternatively, after router 702-4 receives both a DNS Join message and the DNS reply from other routers.

Furthermore, while a series of blocks have been described with regard to the process illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
a line card including a memory that stores a local routing table, configured to:
request a routing entry from a routing table,
receive the routing entry,
insert the routing entry in the local routing table, and
age out stale routing entries from the local routing table; and
a control module that includes:
the routing table, and
a domain name server (DNS) database that includes a list of DNS addresses, wherein the list of DNS addresses includes an Internet Protocol (IP) address of an authoritative DNS, wherein the control module is configured to:
seed the local routing table with a routing entry corresponding to the IP address, in the DNS database included in the control module, of the authoritative DNS, and
distribute the routing entry in the routing table to the line card in response to the request from the line card,
wherein the DNS database is not a routing table;
wherein the line card is further configured to:
receive a first packet, and
identify the first packet as a DNS request,
wherein the control module is further configured to:
send a request to other routers to send copies of replies to the DNS request to the device;
wherein the line card is further configured to:
receive a DNS reply in response to the request to the other routers,
determine whether the local routing table includes a DNS flow entry corresponding to an address resolved by the DNS reply, and
notify the control module when the local routing table does not include the DNS flow entry; and
wherein the control module is further configured to:
lookup the DNS flow entry in the routing table, and
populate the local routing table with the DNS flow entry,
wherein, when populating the local routing table with the DNS flow entry, the control module is further configured to set a flag in the DNS flow entry to indicate whether the routing table includes a second routing entry whose corresponding address prefix matches that of the DNS flow entry, wherein the corresponding address prefix of the second routing entry is longer than that of the DNS flow entry.

2. The device of claim 1, wherein the memory includes:
a static random access memory (SRAM); or
a ternary content addressable memory (TCAM).

3. The device of claim 1, wherein the local routing table includes one of a local forwarding information base (local FIB) or a local label forwarding information base (local LFIB), and wherein the routing table includes a best routing information base (BRIB).

4. The device of claim 3, wherein the line card is further configured to:
decrement age out counters of routing entries in the local FIB at regular time intervals.

5. The device of claim 4, wherein the line card is further configured to:
select, in the local FIB, routing entries whose age out counters are at a minimum value; and
mark the selected routing entries as being eligible to be overwritten.

6. The device of claim 3, wherein the line card is further configured to:
prevent the routing entry corresponding to the IP address of the authoritative DNS from being aged out of the local FIB.

7. The device of claim 3, wherein the control module is further configured to:
resolve the IP address of the authoritative DNS by issuing recursive queries to DNS servers.

8. The device of claim 3, wherein the line card is further configured to:
receive a packet,
lookup a first routing entry that corresponds to a destination address of the packet in the local FIB,
determine, based on a second flag associated with the first routing entry, whether the BRIB includes a second routing entry whose matching address prefix is longer than that of the first routing entry,
locate the second routing entry in the BRIB when the second flag indicates the BRIB includes the second routing entry, and
send the second routing entry to the local FIB when the matching address prefix of the second routing entry provides a longer match to the destination address of the packet than a matching address prefix of the first routing entry.

9. The device of claim 8, wherein the line card is further configured to:
decrement an age out counter that is associated with the second routing entry in the local FIB when the second routing entry is not accessed for a predetermined amount of time.

10. The device of claim 9, wherein the line card is further configured to:
mark the second routing entry in the local FIB as being eligible to be overwritten when the age out counter indicates that the second routing entry is stale.

11. The device of claim 8, wherein the line card is further configured to:
use the first routing entry to locate an egress line card and send the packet to the egress line card when the second flag indicates that the BRIB does not include the second routing entry.

12. The device of claim 3, further comprising:
an intrusion detection and prevention module to:
detect spurious packets generated by misconfigured or malicious remote devices, and
remove routing entries that are installed in the local FIB as a result of receiving the spurious packets.

13. A router comprising:
a line card including a memory that stores a local routing table, configured to:
request a routing entry from a routing table,
receive the routing entry,
insert the routing entry in the local routing table, and
age out stale routing entries from the local routing table; and
a control module including the routing table, configured to:
distribute the routing entry in the routing table to the line card in response to the request from the line card;
wherein the line card is further configured to:
receive a first packet, and
identify the first packet as a domain name system (DNS) request;

wherein the control module is further configured to:
    send a request to other routers to send copies of replies to the DNS request to the router;
wherein the line card is further configured to:
    receive a DNS reply in response to the request to the other routers,
    determine whether the local routing table includes a DNS flow entry corresponding to an address resolved by the DNS reply, and
    notify the control module when the local routing table does not include the DNS flow entry;
wherein the control module is further configured to:
    lookup the DNS flow entry in the routing table, and
    populate the local routing table with the DNS flow entry,
    wherein the DNS flow entry comprises an Internet Protocol address of an authoritative DNS,
    wherein, when populating the local routing table with the DNS flow entry, the control module is further configured to set a flag in the DNS flow entry to indicate whether the routing table includes a second routing entry whose corresponding address prefix matches that of the DNS flow entry, wherein the corresponding address prefix of the second routing entry is longer than that of the DNS flow entry,
    wherein the local routing table includes one of a local forwarding information base (local FIB) or a local label forwarding information base (local LFIB), and
    wherein the routing table includes a best routing information base (BRIB).

14. The router of claim 13, wherein the request to the other routers includes a request to join a multicast tree.

15. The router of claim 13, wherein the line card is further configured to:
    receive a second packet,
    identify the second packet as a reply to a DNS request, and
    notify the control module of a receipt of the reply when a routing entry that corresponds to a resolving address provided in the DNS request is not in the local FIB; and
wherein the control module is further configured to:
    locate, in the BRIB, a routing entry that corresponds to the resolving address in response to being notified from the line card, and
    send the routing entry in the BRIB to the line card.

16. The router of claim 15, wherein the line card is further configured to:
    receive the routing entry in the BRIB from the control module, and
    set an age out counter associated with the routing entry to a predetermined value.

17. A method comprising:
    requesting, by a line card of a router, a routing entry from a routing table, wherein the line card stores a local routing table;
    receiving, by the line card, the routing entry;
    inserting, by the line card, the routing entry in the local routing table;
    aging out, by the line card, stale routing entries from the local routing table;
    distributing, by a control module of the router, the routing entry in the routing table to the line card in response to the request from the line card, wherein the control module includes the routing table;
    receiving, by the line card, a first packet;
    identifying, by the line card, the first packet as a domain name system (DNS) request;
    sending, by the control module, a request to other routers to send copies of replies to the DNS request to the router;
    receiving, by the line card, a DNS reply in response to the request to the other routers;
    determining, by the line card, whether the local routing table includes a DNS flow entry corresponding to an address resolved by the DNS reply;
    notifying, by the line card, the control module when the local routing table does not include the DNS flow entry;
    looking up, by the control module, the DNS flow entry in the routing table; and
    populating, by the control module, the local routing table with the DNS flow entry,
    wherein the DNS flow entry comprises an Internet Protocol address of an authoritative DNS,
    wherein populating the local routing table with the DNS flow entry further includes setting, by the control module, a flag in the DNS flow entry to indicate whether the routing table includes a second routing entry whose corresponding address prefix matches that of the DNS flow entry,
    wherein the corresponding address prefix of the second routing entry is longer than that of the DNS flow entry,
    wherein the local routing table includes one of a local forwarding information base (local FIB) or a local label forwarding information base (local LFIB), and
    wherein the routing table includes a best routing information base (BRIB).

18. The method of claim 17, wherein the request to the other routers includes a request to join a multicast tree.

19. The method of claim 17, further comprising:
    receiving, by the line card, a second packet;
    identifying, by the line card, the second packet as a reply to a DNS request;
    notifying, by the line card, the control module of a receipt of the reply when a routing entry that corresponds to a resolving address provided in the DNS request is not in the local FIB;
    locating, by the control module and in the BRIB, a routing entry that corresponds to the resolving address in response to being notified from the line card; and
    sending, by the control module, the routing entry in the BRIB to the line card.

20. The method of claim 19, further comprising:
    receiving, by the line card, the routing entry in the BRIB from the control module; and
    setting, by the line card, an age out counter associated with the routing entry to a predetermined value.

* * * * *